United States Patent
Rosenthal et al.

(10) Patent No.: US 10,562,827 B1
(45) Date of Patent: *Feb. 18, 2020

(54) POLYMER COATED FERTILIZER

(71) Applicant: Nutrient Encapsulation Technologies, Sarasota, FL (US)

(72) Inventors: Eric Rosenthal, Sarasota, FL (US); Brian Patterson, Bradenton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/566,148

(22) Filed: Sep. 10, 2019

Related U.S. Application Data

(63) Continuation of application No. 16/371,449, filed on Apr. 1, 2019.

(51) Int. Cl.
| | | |
|---|---|---|
| *C05G 3/00* | (2020.01) | |
| *C05C 3/00* | (2006.01) | |
| *C05C 5/02* | (2006.01) | |
| *C05C 9/00* | (2006.01) | |
| *C05D 1/00* | (2006.01) | |
| *C05C 1/00* | (2006.01) | |
| *C05B 7/00* | (2006.01) | |
| *C05B 3/00* | (2006.01) | |
| *C05D 9/00* | (2006.01) | |

(52) U.S. Cl.
CPC .............. *C05G 3/0035* (2013.01); *C05B 3/00* (2013.01); *C05B 7/00* (2013.01); *C05C 1/00* (2013.01); *C05C 3/005* (2013.01); *C05C 5/02* (2013.01); *C05C 9/005* (2013.01); *C05D 1/005* (2013.01); *C05D 9/00* (2013.01); *C05G 3/0029* (2013.01)

(58) Field of Classification Search
None
See application file for complete search history.

(56) References Cited

U.S. PATENT DOCUMENTS

| | | | | |
|---|---|---|---|---|
| 5,466,274 | A * | 11/1995 | Hudson | C05G 3/0023 71/28 |
| 10,189,752 | B2 * | 1/2019 | Achille | C09D 163/00 |
| 2006/0089259 | A1 * | 4/2006 | Driessen | A01N 25/34 504/101 |
| 2007/0072775 | A1 * | 3/2007 | van Boxtel-Verhoeven | A01N 25/12 504/367 |
| 2010/0011825 | A1 * | 1/2010 | Ogle | C05C 9/005 71/30 |
| 2012/0111075 | A1 * | 5/2012 | Hargrove | C05G 3/0029 71/27 |
| 2012/0111076 | A1 * | 5/2012 | Avdala | C05G 3/0029 71/27 |
| 2012/0111077 | A1 * | 5/2012 | Maruvada | C05G 3/0029 71/27 |
| 2014/0298873 | A1 * | 10/2014 | Garg | C05G 3/0035 71/28 |
| 2015/0376077 | A1 * | 12/2015 | Barr | C05G 3/0029 71/28 |
| 2017/0088480 | A1 * | 3/2017 | Kannan | C05G 3/0029 |
| 2017/0283339 | A1 * | 10/2017 | Obrestad | C09D 191/06 |
| 2018/0094163 | A1 * | 4/2018 | Goodwin, II | C09D 175/08 |

* cited by examiner

*Primary Examiner* — Wayne A Langel

(57) ABSTRACT

A controlled release fertilizer has been prepared comprising a nutrient core coated with one or more moisture barrier coatings, at least one of said moisture barrier coatings comprising: at least one polyethylene wax; and a thermoset polyurethane from the reaction of a polyol and a polyisocyanate. The weight ratio of thermoset polyurethane to polyethylene wax is from about 50:50 to about 98:2. The polyethylene wax is heated above the melt point of the polyethylene wax and mixed and dispersed into the polyol component of the thermoset polyurethane in a ratio of 90-70% polyol to 10-30% polyethylene wax before the thermoset polyurethane-forming mixture is applied to the surface of the nutrient core and cured. A coating of a high temperature microcrystalline wax can be applied prior to final curing of the thermoset polyurethane to the coated nutrient core particles.

6 Claims, No Drawings

POLYMER COATED FERTILIZER

FIELD OF THE INVENTION

This invention relates to the art of fertilizer and, more particularly, to a coated granular fertilizer in which the dissolution rates of water-soluble fertilizer components are controlled by coating or encapsulating a granular fertilizer.

BACKGROUND OF THE INVENTION

Achieving crop fertilization by timing the release or application of fertilizer nutrients is known. Fertilization in the container-grown wholesale plant industry, for example, has been accomplished by methods including:
  Multiple applications of granular fertilizer
  Overhead liquid application of soluble fertilizers
  Incorporating slow release fertilizers into potting soil
  Polymer coated fertilizers.

Existing controlled release fertilizers have limited use in specialty agricultural markets where tropical (hot/humid/wet) conditions exist. Prior controlled release fertilizers are either not cost effective for use in these markets or do not perform as claimed (lacking true product longevity) or desired by the grower.

A new product is needed because existing, cost-effective, polymer coated fertilizers for use in specialty agricultural do not perform as demanded in tropical conditions. Excess heat (over 90° F.) can stress the coating of other fertilizer and accelerate their release and dramatically reduce their overall effectiveness in the field.

Inefficient fertilization using past existing polymer coated fertilizers increases costs and losses with respect to crops. To achieve the safe release of nutrient, current coated fertilizers must be relatively thickly coated, as measured by percentages of weight. Thicker coatings are necessarily costlier as result of, inter alia, the need for more coating materials. What is needed is an encapsulated fertilizer that can safely release nutrient to plants using coating that is more efficient.

SUMMARY OF THE INVENTION

The present invention to a process for producing polyurethane encapsulated, fertilizer substrate (particles). The process comprises applying an isocyanatereactive component that includes a polyol containing a polyethylene wax (curable sealant) to form a coating on the fertilizer particles and applying an isocyanate component onto said fertilizer particles and curing the coating and further comprising applying a high temperature point microcrystalline wax to the coated particles during the last stages of curing of the isocyanate-containing coating. The applications of each component may be repeated to form the polyurethane encapsulated fertilizer particles. The particle coating can preferably have a minimum of 2% coating by weight with a minimum of 2 two polyurethane layers, or a maximum coating weight of 5% or 4 four polyurethane layers.

Among the features of the invention is that the coating composition comprises a curable sealant wherein a wax sealant is built into the polymer membrane/matrix thus eliminating an added step requiring a separate additive sealant layer. A second feature of the invention is the application of a high temperature microcrystalline wax to the particles during the final stages of the curing of the polyurethane layer.

The present invention encompasses a novel continuous process production method for coating instead of the current batch production method.

One of the advantages of the present invention is that the present coated fertilizer can have 45% or more Nitrogen for controlled release fertilizer. Currently a 44.5% is the maximum available commercially available product. Optionally, the present invention can comprise the addition of dry powdered ingredients/nutrients such as, for example biostimulants underneath the coating.

The present invention utilizes a second wax coating comprising a high heat (micro-crystalline) wax application during the final stages of the curing of the polyurethane to cure on the hot material being cured thus avoiding final cooling step in the process; basically, heating liquid wax to about 190° F. and spraying onto about 160° F. product and curing instantly. A non-limiting example of a high temperature microcrystalline wax useful in the present invention is MICROSERE@ 5890A. MICROSERE@ 5890A is a white, high-melt, microcrystalline wax that is used in a variety of applications. MICROSERE@ 5890A complies with the requirements for "Microcrystalline Wax" set by the United States Pharmacopeia (USP)/National Formulary (NF). MICROSERE@ 5890A has the following properties:

| PHYSICAL PROPERTIES | | | | |
| --- | --- | --- | --- | --- |
| TEST | ASTM | SPECIFICATIONS | | |
| METHODS | METHOD | Minimum | Maximum | TYPICAL |
| Drop Melt Point ° F. ° C. | D 127 | 175 79.4 | 188 86.7 | 181 (82.8 |
| Kinematic Viscosity, cSt 212° F. 100° C. | D 445 | 14.0 | | |
| Oil Content, Wt. % | D 721 | | 2.0 | |
| Sa bolt Color | D 6045 | +16 | | |
| Odor | D 1833 | | 2 | 1 |
| Needle Penetration, dmm 77° F. 250 C. | D 1321 | 15 | 22 | 21 |

Note:
Physical properties for which ONLY a typical value is listed are included as additional information but may not be printed on the COA.

FDA Status:

This product meets the FDA requirements set forth in 21 CFR 178.3710 for use in nonfood articles in contact with food. For additional FDA compliance information, please contact your IGI Sales Representative.

An advantage of the present invention is that the invention can be focused on specialty agricultural markets and on improving crop yields.

The present invention provides a technology which allows for a coating that is thinner than presently available products on the market wherein the new coated fertilizer increases the Nitrogen value and provides a more cost-effective cost per unit of Nitrogen. for the grower when applying fertilizer. The grower is therefore able to use fewer total tons (less cost and environmental burden) to achieve a similar desired result/yield. The novel coated fertilizer provides a more efficient delivery of nutrients to the crop in that it releases nutrients more lineal or time in tropical conditions compared to competitive products.

The present invention solves the problem of providing agricultural grower in tropical conditions (such as, for example Florida) with a cost effective and enhanced efficiency form of fertilizer when compared to conventional 'raw' or uncoated granular fertilizer or other polymer coated fertilizers currently on the market.

The present invention also reduces environmental nitrogen/nutrient loss from volatilization or leaching into ground water and can save growers cost with a more efficient product that allows them to apply less overall material to their crops.

DETAILED DESCRIPTION OF THE INVENTION

The present comprises controlled release fertilizer comprising a nutrient core coated with one or more moisture barrier coatings, at least one of said moisture barrier coatings comprising: at least one polyethylene wax; and a thermoset polyurethane from the reaction of a polyol and a polyisocyanate. The weight ratio of thermoset polyurethane to polyethylene wax is from about 50:50 to about 98:2, and the polyethylene wax is heated above the melt point of the polyethylene wax and mixed and dispersed into the polyol component of the thermoset polyurethane in a ratio of 90-70% polyol to 10-30% polyethylene wax before the thermoset polyurethane-forming mixture is applied to the surface of the nutrient core and cured. A coating of a high temperature microcrystalline wax which is applied prior to final curing of the thermoset polyurethane to the coated nutrient core particles.

MDI can be the curing agent for the preparation of the thermoset polyurethane and the particle coating preferably has a minimum of 2% coating by weight with a minimum of 2 polyurethane layers, or a maximum coating weight of 8% or 4 polyurethane layers.

A bio-stimulant is optionally applied to the nutrient core prior to coating or added to the microcrystalline wax The method of producing a controlled release fertilizer of the present invention comprises the steps of: providing a quantity of nutrient core particles; heating the nutrient core particles to a temperature above the melting point of a polyethylene wax polyol mixture; providing one or more moisture barrier coatings, at least one of said moisture barrier coatings comprising: at least one polyethylene wax; and a thermoset polyurethane from the reaction of a polyol and a polyisocyanate; heating the polyol component of the polyurethane to a temperature above the melting point of the polyethylene wax; dispersing the polyethylene wax into the heated polyol and forming a dispersion of polyethylene wax in the heated polyol; applying the dispersion of polyethylene wax and polyol and polyisocyanate to the nutrient core particles while providing mixing enough to spread the dispersion as a coating on the fertilizer particles; curing the thermoset polyurethane on the surface of the particles to form free flowing coated granules; and in the final stages of the curing of the polyurethane coating applying to the coated fertilizer particles with a high temperature microcrystalline wax and continued curing the coated fertilizer particles and cooling the coated nutrient particles to form polyurethane coated particles having an outer layer of solidified microcrystalline wax. The weight ratio of thermoset polyurethane to polyethylene wax is from about 50:50 to about 98.2. heating the polyol component of the polyurethane to a temperature above the melting point of the polyethylene wax;

A bio-stimulant is optionally applied to the nutrient core particles or added to the microcrystalline wax.

The coated granular fertilizer according to the invention comprises a particulate fertilizer which is coated with a novel resin composition. The particulate fertilizer used in the present invention is not critical with respect to the type and may be any known chemical fertilizer. Examples of the fertilizer include ammonium sulfate, ammonium chloride, ammonium nitrate, urea, potassium chloride, potassium sulfate, potassium nitrate, sodium nitrate, ammonium phosphate, potassium phosphate, calcium phosphate, and composite fertilizers thereof.

The granular fertilizer is coated with a water-resistant film-forming polyurethane composition. The composition should comprise an isocyanate-reactive polyol and an isocyanate component, and a second wax coating of a high heat (micro-crystalline) wax prior to final curing.

The isocyanate can be, for example a diisocyanate, or a polyisocyanate. A nonlimiting example of a diisocyanate is polymeric MDI (4,4 diphenylmethane diisocyanate), however, other poly-functional isocyanates can be utilized and include aliphatic, aromatic, and aliphatic aromatic polyisocyanates. Isocyanates containing two or more NCO groups available for reaction and, as known to one skilled in the art, are widely used in the production of urethane polymers. Non-limiting examples of suitable isocyanates include: 1,6-hexamethylene diisocyanate, 1,4-butylene diisocyanate, furfuryurylidene diisocyanate, 2,4-toluene diisocyanate, 2,6 toluene diisocyanate, 2,4'diphenylmethane diisocyanate, 4,4'-diphenylmethane diisocyanate, 4,4'diphenylpropane diisocyanate, 4,4'-diphenyl-3,3'-dimethyl methane diisocyanate, 1,5naphthalene diisocyanate, 1-methyl-2,4-diisocyanate-5-chlorobenzene, 2,4diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-ylylene diisocyanate, bis-(4-isocyanatophenyl)methane, bis-(3-methyl-4-isocyanatophenyl) methane, polymethylene polyphenyl polyisocyanates and mixtures thereof. MDI (4,4 diphenylmethane diisocyanate) is a preferred isocyanate.

The present coated fertilizer can have a coating of up to about 2%.

The organic wax can be at least one selected from the group consisting of petroleum waxes, synthetic waxes, waxes, natural waxes, and hydrogenated triglycerides. The organic wax can be a paraffin. The polyethylene wax useful in the present invention is a waxy solid having a melting point range of between 55° and 85° C. preferably between 60° and 70° C. The polyethylene wax is a LDPE. The polyethylene was may contain a wax soluble polymer.

A wax soluble polymer can be added to the polyethylene wax which is substantially non-reactive with the said thermoset polymer. The wax soluble polymer can form a homogeneous mixture with the said wax at 100° C. The wax soluble polymer can have a viscosity of less than 10.000 centipoise at 100° C. when at least 2 percent by weight is mixed with the said wax. The wax soluble polymer can be at least one selected from the group consisting of ethylene-vinyl acetate copolymers and terpolymers, modified polyolefins, acrylate ester polymers and copolymers, and tackifying resins The thermoset polymer is a polyurethane.

The coating process of the present invention can be carried out in the following manner.

Fertilizer Substrate (particles) is screened to remove any fines (dust) or off sized material. It is preferred in the present invention to end up with a fertilizer product that has an SGN (Size Guide Number) of 280. A 220-250 SGN product is typically used for turf.

A preferred embodiment of the present invention is to have a larger particle for the product line as this will be going into the agricultural markets and will create a more uniform blend when mixed with other fertilizer components. The larger product size also requires less coating by weight to achieve the optimum performance. The 280 SGN fertilizer granule has less surface area compared to the 220-250 SGN. When adding the same amount of coating to each product, the 280 SGN product will have a slightly thicker coating on each granule thus making it last slightly longer with the same amount of coating.

The fertilizer substrate is heated by, for example running the substrate through a fluidized preheater. This serves two purposes. First, it removes any additional dust that is left on the substrate, secondly, it brings the temperature of the substrate up to about 160-165° F. to start the coating process. 160-165° F. is the preferred temperature which delivers a high-quality finished product.

The fertilizer substrate is placed into a coating vessel where a layering process is begun. It is noted that the coating may be carried out in one or more stages. Inside the coating vessel drum, the Isocyanate (ISO) is applied first and the curable sealant (CS) of the present invention second at a preferred 54%/46% ratio. This combination creates a "layer". In a multiple application procedure, each layer is given about 5 minutes to cure before the next layering process is started. The preferred product of the present invention can have as few as 2 layers and as many as 4.

After the last layer of ISO/CS is added and is in the later stage of curing, a highmelt microcrystalline wax is added to the product. The high-melt wax starts as a solid. The wax is heated to a temperature of about 200° F. in a melting tank at which points it becomes a liquid. The high-melt microcrystalline wax is then sprayed on to later stage of curing of the polyurethane coated fertilizer substrate. The wax becomes solid again and "set" at about 181° F. Since the fertilizer bed is about 160-165° F., the wax will rapidly encapsulate the coated fertilizer substrate and harden. Using the high-melt microcrystalline wax allows the product to be released from the coating vessel and put directly into bulk storage bins without going through an additional cooling step that other CRF technologies must go through when being manufactured.

An example of the present invention is as follows:

An optional step in the present invention process is the optional addition of a bio stimulant. During the addition of the high-melt microcrystalline wax, a bio stimulant may also be added to the coated fertilizer substrate. This bio stimulant can be added and mixed thoroughly into the wax melting tank. By applying the bio stimulant with the wax simultaneously, it can be ensured that each coated particle is carrying the bio stimulant.

The forgoing detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

We claim:

1. A controlled release fertilizer comprising a nutrient core coated with one or more moisture barrier coatings, at least one of said moisture barrier coatings-consisting essentially of: at least one polyethylene wax; and a thermoset polyurethane from the reaction of a polyol and a polyisocyanate; wherein the weight ratio of the thermoset polyurethane to polyethylene wax is from about 50:50 to about 98:2, and wherein the polyethylene wax is heated above the melt point of the polyethylene wax and mixed and dispersed into the polyol component of the thermoset polyurethane in a ratio of 90-70% polyol to 10-30% polyethylene wax before the thermoset polyurethane-forming mixture is applied to the surface of the nutrient core and cured, and wherein after the last layer of the polyurethane-forming coating is added onto the surface of the nutrient core particles and is in the later stage of curing, a melted high-melt microcrystalline wax in liquid form is sprayed onto the coated nutrient core particles and the high-melt microcrystalline wax solidifies and hardens upon contact with the coated nutrient particles and

| StdBOMqty | | Blank | 44-0-0-045BT-YLD | 44.5-0-0-BT-YLD | 45-0-0-BT-YLD |
|---|---|---|---|---|---|
| Chk BOM Total Qty | | — | 1.00000 | 1.00000 | 1.00000 |
| Layer | Type | GA % | 44.091 | 44.551 | 45.011 |
| Add'l/Dual Substrate | | | — | — | — |
| Primary Substrate | | | 0.95850 | 0.96850 | 0.97850 |
| Total Coating Weight % | | | 0.04150 | 0.03150 | 0.02150 |
| ISO | | | — | — | — |
| Wax | | | — | — | — |
| Layer1 | Iso | | 0.00540 | 0.00540 | 0.00540 |
| Layer1 | Curable Sealant | | 0.00460 | 0.00460 | 0.00460 |
| WAX | WAX | | — | — | — |
| Layer2 | Iso | | 0.00540 | 0.00540 | 0.00540 |
| Layer2 | Curable Sealant | | 0.00460 | 0.00460 | 0.00460 |
| WAX | WAX | | — | — | — |
| Layer3 | Iso | | 0.00540 | 0.00540 | — |
| Layer3 | Curable Sealant | | 0.00460 | 0.00460 | — |
| WAX | WAX | | — | — | — |
| Layer4 | Iso | | 0.00540 | — | — |
| Layer4 | Curable Sealant | | 0.00460 | — | — |
| WAX | WAX | | 0.00150 | 0.00150 | 0.00150 | rapidly encapsulates the coated fertilizer substrate to form the polyurethane coated particles having an outer layer of solidified microcrystalline wax.

2. The controlled release fertilizer of claim 1, wherein MDI is the curing agent for the preparation of the thermoset polyurethane.

3. The controlled release fertilizer of claim 1, wherein the particle coating has a minimum of 2% coating by weight with a minimum of 2 polyurethane layers, or a maximum coating weight of 8% or 4 polyurethane layers.

4. The controlled release fertilizer of claim 1, wherein a bio stimulant is optionally applied to the nutrient core prior to coating or added to the microcrystalline wax.

5. A method of producing a controlled release fertilizer comprising the steps of:
   providing a quantity of nutrient core particles;
   heating the nutrient core particles to a temperature above the melting point of a polyethylene wax polyol mixture;
   providing one or more moisture barrier coatings, at least one of said moisture barrier coatings consisting essentially of: at least one polyethylene wax; and a thermoset polyurethane from the reaction of a polyol and a polyisocyanate;
   wherein the weight ratio of thermoset polyurethane to polyethylene wax is from about 50:50 to about 98.2;
   heating the polyol component of the polyurethane to a temperature above the melting point of the polyethylene wax;
   dispersing the polyethylene wax into the heated polyol and forming a dispersion of polyethylene wax in the heated polyol wherein the dispersion comprises 90-70% polyol to 10-30% polyethylene wax;
   applying the dispersion of polyethylene wax and polyol and polyisocyanate to the nutrient core particles while providing mixing enough to spread the dispersion as a coating on the fertilizer particles,
   curing the thermoset polyurethane on the surface of the particles to form free flowing coated granules; and wherein
   in the final stages of the curing of the polyurethane coating after the last layer of polyurethane-forming coating is added onto the surface of the nutrient core particles and is in the later stage of curing, a melted high-melt microcrystalline wax in liquid form is sprayed onto to the coated nutrient core particles and the high-melt microcrystalline wax solidifies and hardens upon contact with the coated nutrient particles and rapidly encapsulates the coated fertilizer substrate and cools the coated nutrient particles to form polyurethane coated particles having an outer layer of solidified microcrystalline wax.

6. The method of claim 5, wherein a bio stimulant is optionally applied to the nutrient core particles or added to the microcrystalline wax.

* * * * *